(12) United States Patent
Eveker et al.

(10) Patent No.: US 10,777,937 B2
(45) Date of Patent: Sep. 15, 2020

(54) DETACHABLE COMMUNICATIONS CONNECTOR FOR VEHICLE STORES AND METHOD THEREFOR

(71) Applicant: The Boeing Company, Chicago, IL (US)

(72) Inventors: James V Eveker, St. Louis, MO (US); Cory G Keller, St. Charles, MO (US); Alberto A Martinez, Wentzville, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/396,148

(22) Filed: Apr. 26, 2019

(65) Prior Publication Data

US 2019/0260159 A1 Aug. 22, 2019

Related U.S. Application Data

(63) Continuation of application No. 15/900,039, filed on Feb. 20, 2018, now Pat. No. 10,312,631.

(51) Int. Cl.
| | |
|---|---|
| *H01R 13/62* | (2006.01) |
| *H01R 43/26* | (2006.01) |
| *H01R 27/02* | (2006.01) |
| *H01R 13/52* | (2006.01) |
| *H01R 13/631* | (2006.01) |
| *B60R 16/023* | (2006.01) |

(52) U.S. Cl.
CPC ......... *H01R 13/6205* (2013.01); *H01R 27/02* (2013.01); *H01R 43/26* (2013.01); *B60R 16/023* (2013.01); *H01R 13/5219* (2013.01); *H01R 13/6315* (2013.01); *H01R 2201/26* (2013.01)

(58) Field of Classification Search
CPC ..... H01R 13/6205; H01R 27/02; H01R 43/26
USPC .......................................... 439/39
See application file for complete search history.

(56) References Cited

U.S. PATENT DOCUMENTS

| | | | | |
|---|---|---|---|---|
| 3,049,690 A | * | 8/1962 | Sparber | H01R 13/6335 439/258 |
| 3,496,519 A | * | 2/1970 | Vetter | H01R 13/635 439/258 |
| 3,678,439 A | * | 7/1972 | Vetter | H01R 13/623 439/253 |
| 4,138,181 A | * | 2/1979 | Hacker | H01R 13/635 439/258 |
| 4,279,458 A | * | 7/1981 | Knapp | H01R 13/622 285/316 |

(Continued)

OTHER PUBLICATIONS

"ITTs Field Replaceable Connector System achieves No-Jam success at Exercise Red Flag</", https://www.harris.com/press-releases/2008/09/itts-field-replaceable-connector-system-achieves-no-jam-success-at-exercise, Sep. 2, 2008; Printed Jan. 11, 2018.

*Primary Examiner* — Alexander Gilman
(74) *Attorney, Agent, or Firm* — Perman & Green LLP

(57) ABSTRACT

A communications connector for a vehicle store comprises a vehicle store receptacle interface plate, and a vehicle store communications receptacle, coupled to a host vehicle, that is magnetically coupled to the vehicle store receptacle interface plate so that the vehicle store communication receptacle is decoupled from the vehicle store receptacle interface plate upon release of the vehicle store from the host vehicle.

20 Claims, 10 Drawing Sheets

(56) References Cited

U.S. PATENT DOCUMENTS

| | | | | |
|---|---|---|---|---|
| 5,080,600 | A * | 1/1992 | Baker | H01R 13/633 |
| | | | | 439/258 |
| 7,311,526 | B2 * | 12/2007 | Rohrbach | G06F 1/18 |
| | | | | 439/39 |
| 7,726,974 | B2 * | 6/2010 | Shah | H05B 33/0803 |
| | | | | 439/40 |
| 8,052,444 | B1 * | 11/2011 | McMahon | F41F 3/055 |
| | | | | 439/258 |
| 8,888,500 | B2 | 11/2014 | Gao et al. | |
| 8,915,609 | B1 * | 12/2014 | Shah | F21S 4/10 |
| | | | | 362/183 |
| 9,391,394 | B2 * | 7/2016 | Kockx | A61N 1/048 |
| 9,515,420 | B2 * | 12/2016 | Daoura | H01R 13/6205 |
| 9,632,535 | B2 * | 4/2017 | Carnevali | G06F 1/181 |
| 9,703,271 | B2 * | 7/2017 | Kim | H01R 13/6205 |
| 9,899,753 | B1 * | 2/2018 | Chiang | H01R 13/6205 |
| 9,912,100 | B2 * | 3/2018 | Zantout | H01R 13/6205 |
| 9,991,628 | B2 * | 6/2018 | Daoura | H01R 13/6205 |
| 9,991,657 | B2 * | 6/2018 | Powers | H01R 31/06 |
| 10,004,144 | B2 * | 6/2018 | Yazaki | H01F 27/29 |
| 10,312,631 | B1 * | 6/2019 | Eveker | H01R 27/02 |
| 10,348,024 | B2 * | 7/2019 | Yonnet | H01R 13/6205 |
| 2005/0255718 | A1 * | 11/2005 | McLeish | H01R 13/6205 |
| | | | | 439/39 |
| 2011/0240799 | A1 * | 10/2011 | McMahon | B64D 1/06 |
| | | | | 244/137.4 |
| 2013/0005159 | A1 * | 1/2013 | Gao | H01R 13/17 |
| | | | | 439/39 |
| 2013/0023816 | A1 * | 1/2013 | Bachinski | A61N 1/36014 |
| | | | | 604/20 |
| 2013/0040470 | A1 * | 2/2013 | Gao | H01R 13/508 |
| | | | | 439/39 |

* cited by examiner

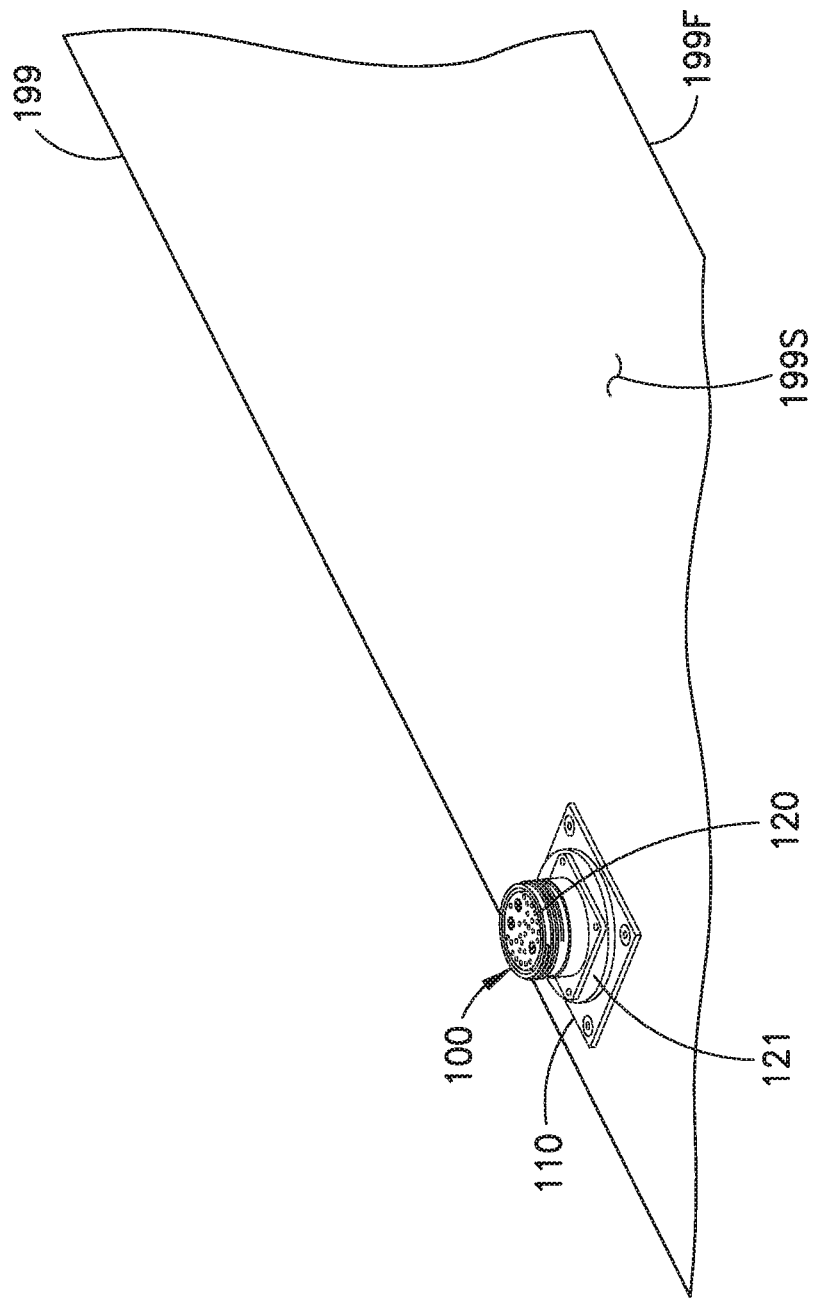

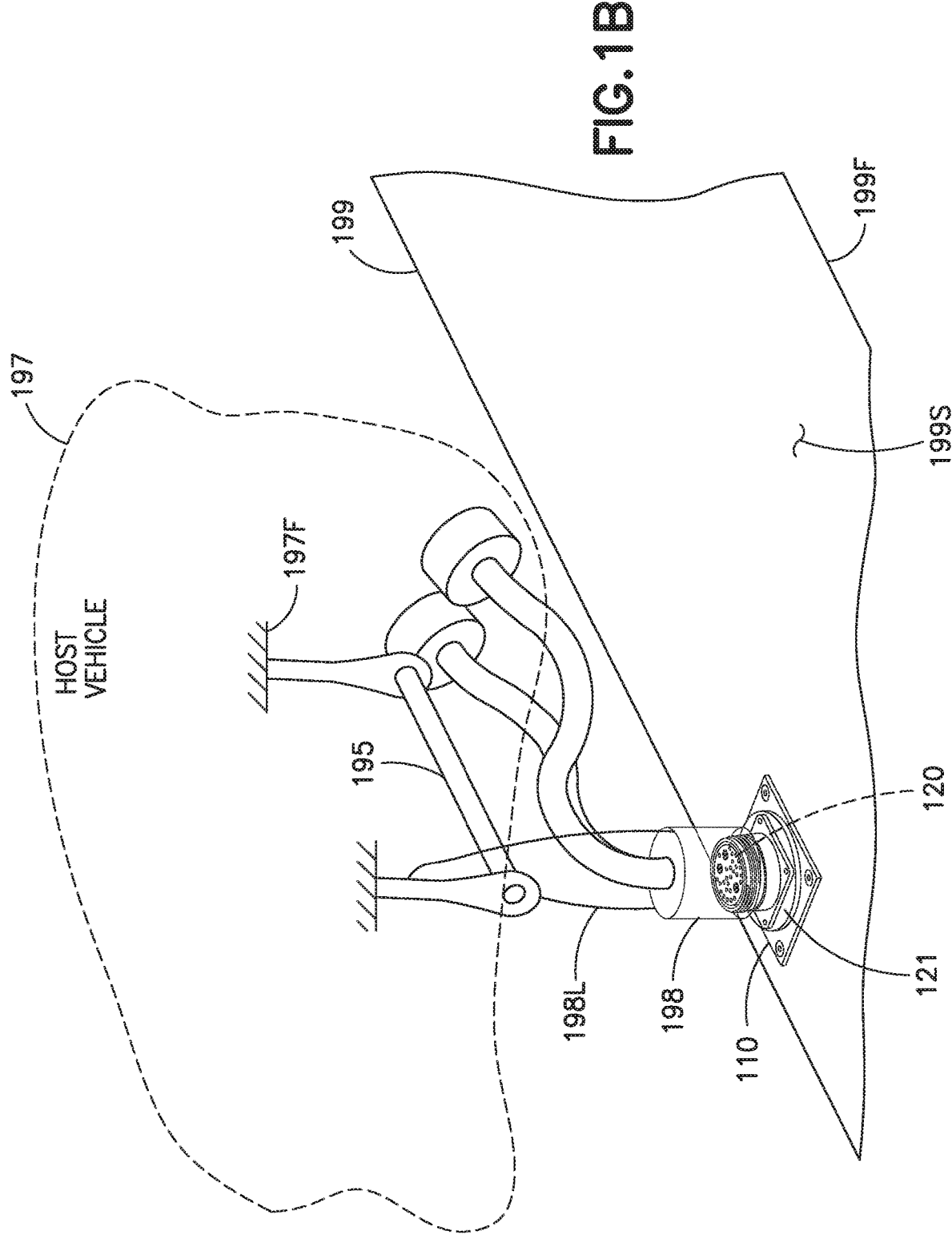

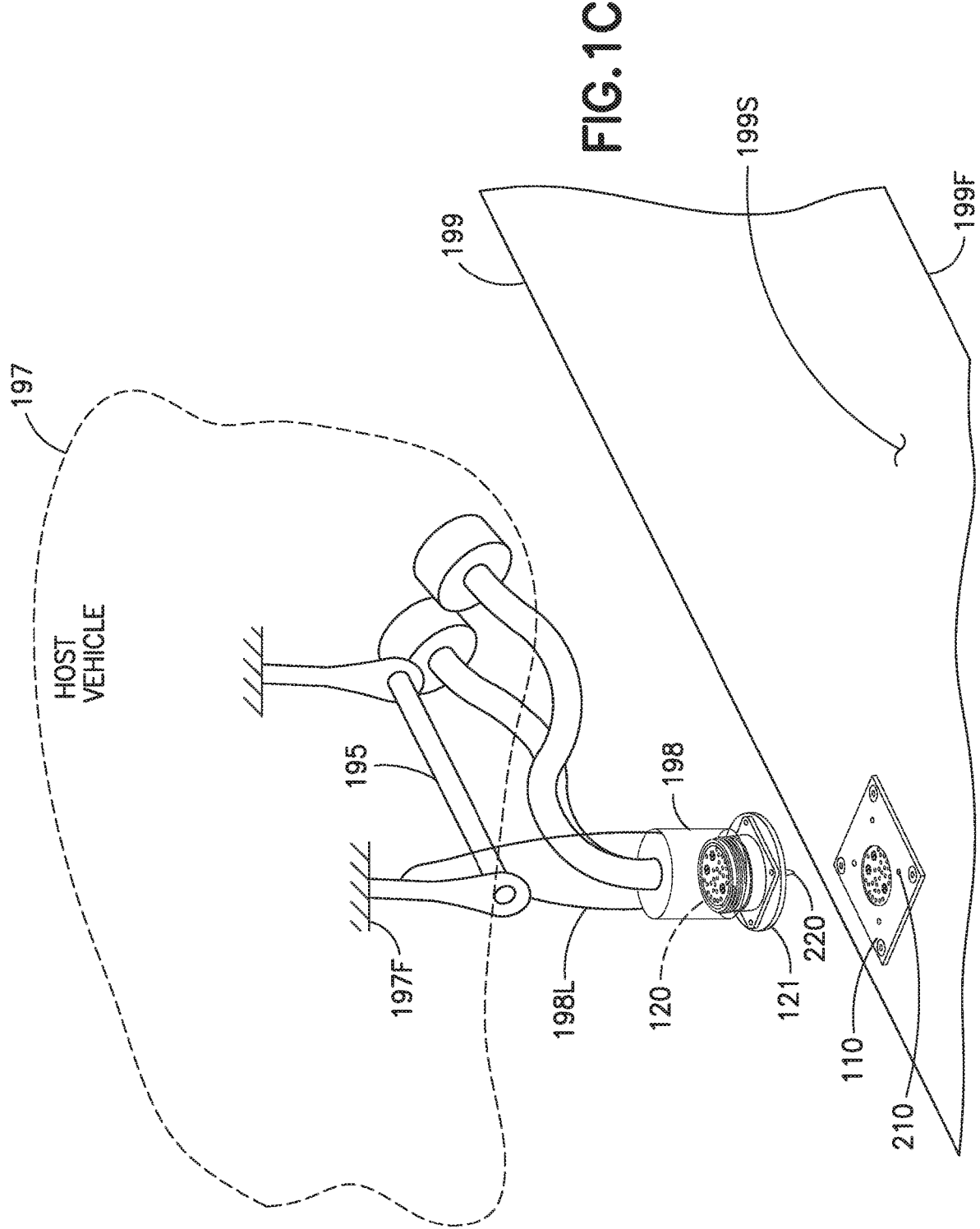

DETACHABLE COMMUNICATIONS CONNECTOR FOR VEHICLE STORES AND METHOD THEREFOR

This technical information requires an export license prior to dissemination to foreign persons. It is controlled by United States International Traffic in Arms Regulations (ITAR) (22 CFR 120130). It is the responsibility of each individual in control of this data to abide by all export laws.

CROSS-REFERENCE TO RELATED APPLICATIONS

This application is a continuation of and claims the benefit of U.S. patent application Ser. No. 15/900,039 filed on Feb. 20, 2018, the disclosure of which is incorporated herein by reference in its entirety.

BACKGROUND

1. Field

The exemplary embodiments generally relate to communications connectors and in particular to communications connectors for vehicle stores.

2. Brief Description of Related Developments

Generally, vehicle stores (i.e., such as launch weapons) on host vehicles (such as aircraft) are coupled to the host vehicle using an umbilical lanyard plug that mates with a communications receptacle of the vehicle store. These communications receptacles are permanently coupled to the vehicle store. Permanent coupling of the store communications receptacle to the vehicle store prevents the vehicle store from having a smooth aerodynamic surface. For example, the communications receptacle protrudes from the surface of the vehicle store and creates drag during flight of the vehicle store. The drag created by the communications receptacle may decrease range performance of the vehicle store.

The umbilical cables of the host vehicle on which the vehicle store is carried may also fail to decouple from the vehicle store communications receptacle when the vehicle store is released from the host vehicle.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a communications connector for a vehicle store, the communications connector comprising: a receptacle interface plate; and a communications receptacle configured for coupling with an umbilical lanyard plug of a host vehicle, the communications receptacle having at least one magnetic member configured to couple the communications receptacle to the receptacle interface plate so that the communications receptacle is decoupled from the receptacle interface plate upon release of the vehicle store from the host vehicle.

Another example of the subject matter according to the present disclosure relates to a vehicle store comprising: a communications connector including a receptacle interface plate, and a communications receptacle configured for coupling with an umbilical lanyard plug of a host vehicle, the communications receptacle having at least one magnetic member configured to couple the communications receptacle to the receptacle interface plate so that the communications receptacle is decoupled from the receptacle interface plate upon release of the vehicle store from the host vehicle.

Still another example of the subject matter according to the present disclosure relates to a method for decoupling a communications connector of a vehicle store when the vehicle store is released from the vehicle. The communications connector includes a receptacle interface plate and a communications receptacle. The method comprising: decoupling the communications receptacle, that is coupled to an umbilical lanyard plug of a host vehicle, from the receptacle interface plate, that is coupled to the vehicle store; wherein a coupling force generated between at least one magnetic member, of the communications receptacle, and the receptacle interface plate is less than a coupling force between the umbilical lanyard plug and the communications receptacle so that the umbilical lanyard plug decouples the communications receptacle from the receptacle interface plate when the vehicle store is released from the host vehicle.

BRIEF DESCRIPTION OF THE DRAWINGS

Figure 2A:
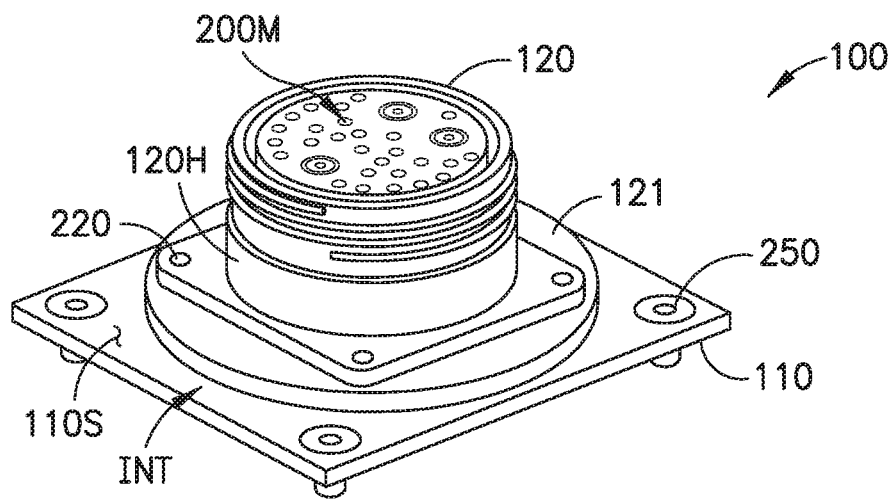
Figure 2B:
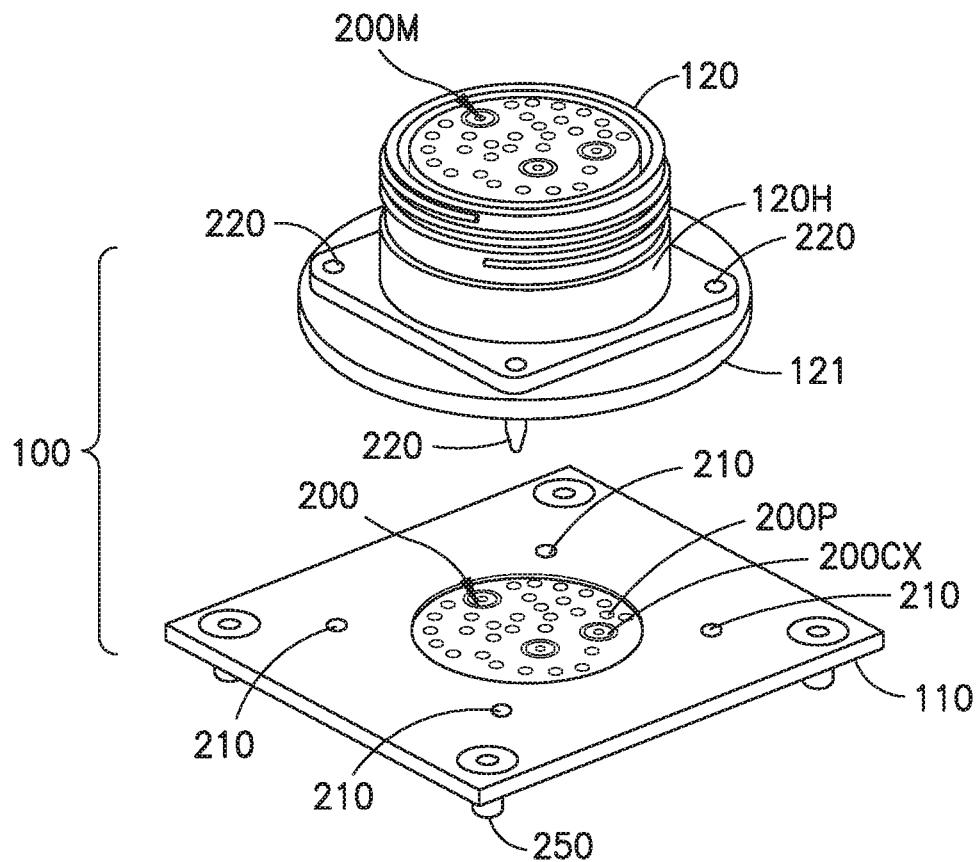
Figure 3A:
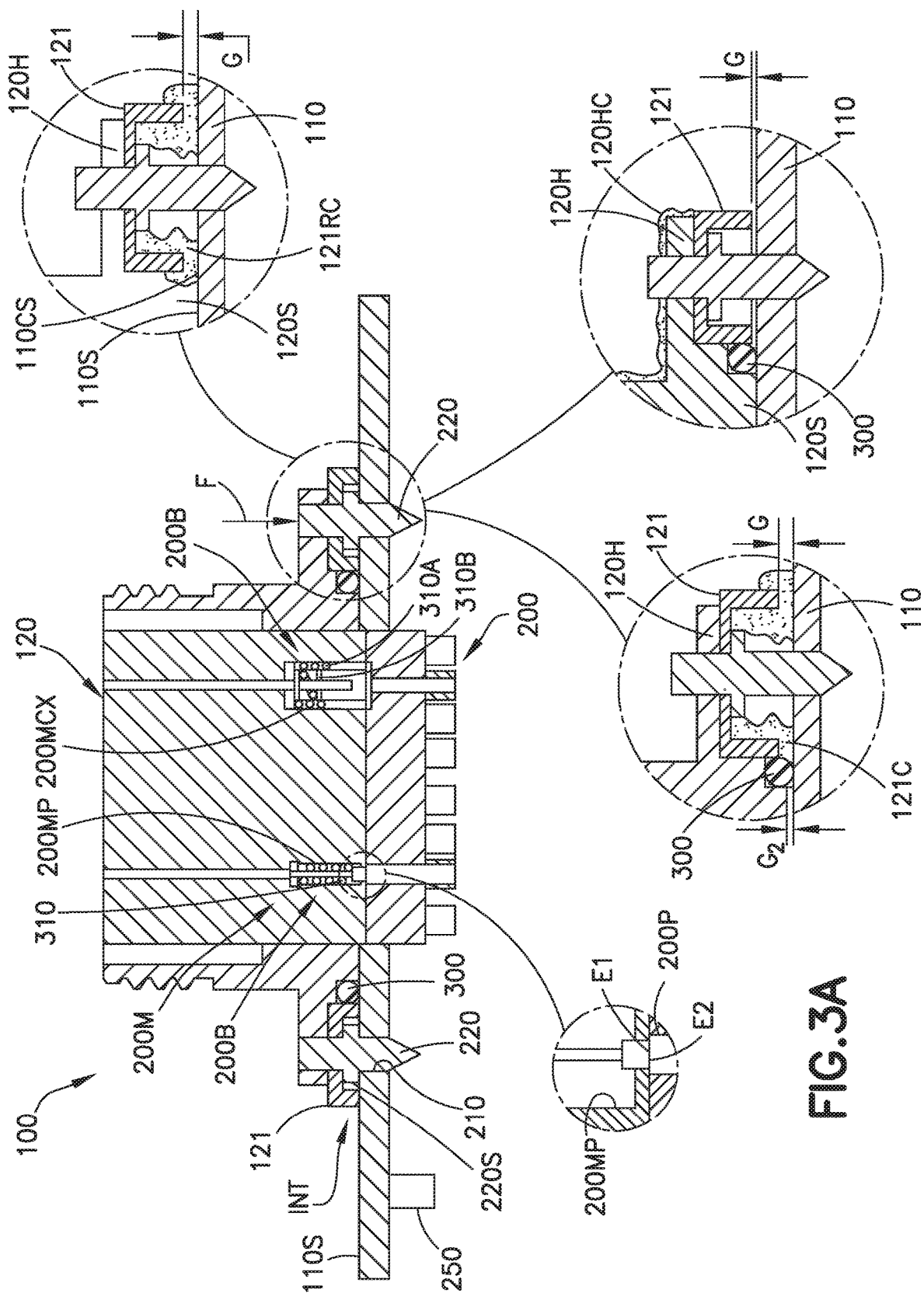
Figure 3B:
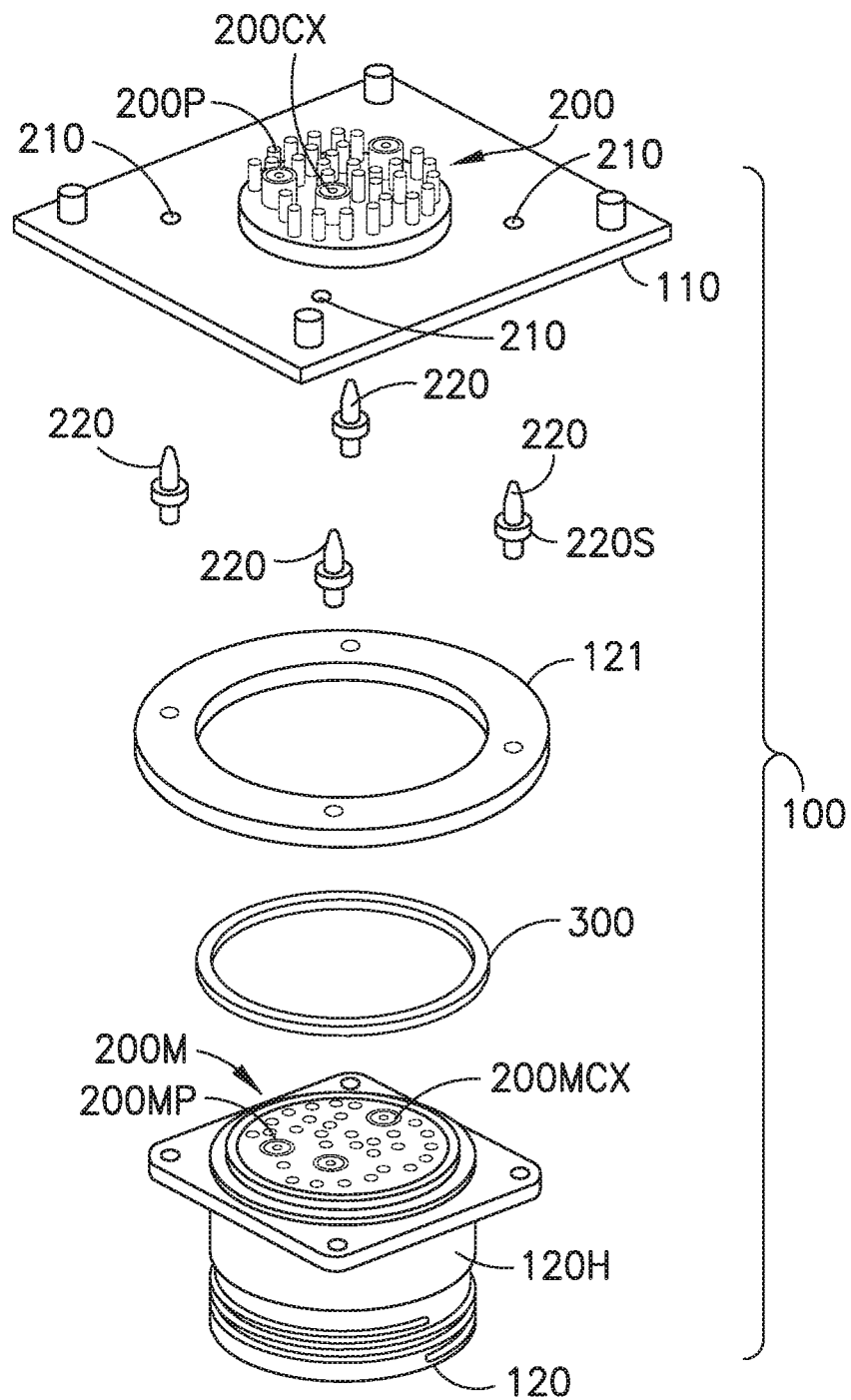
Figure 3C:
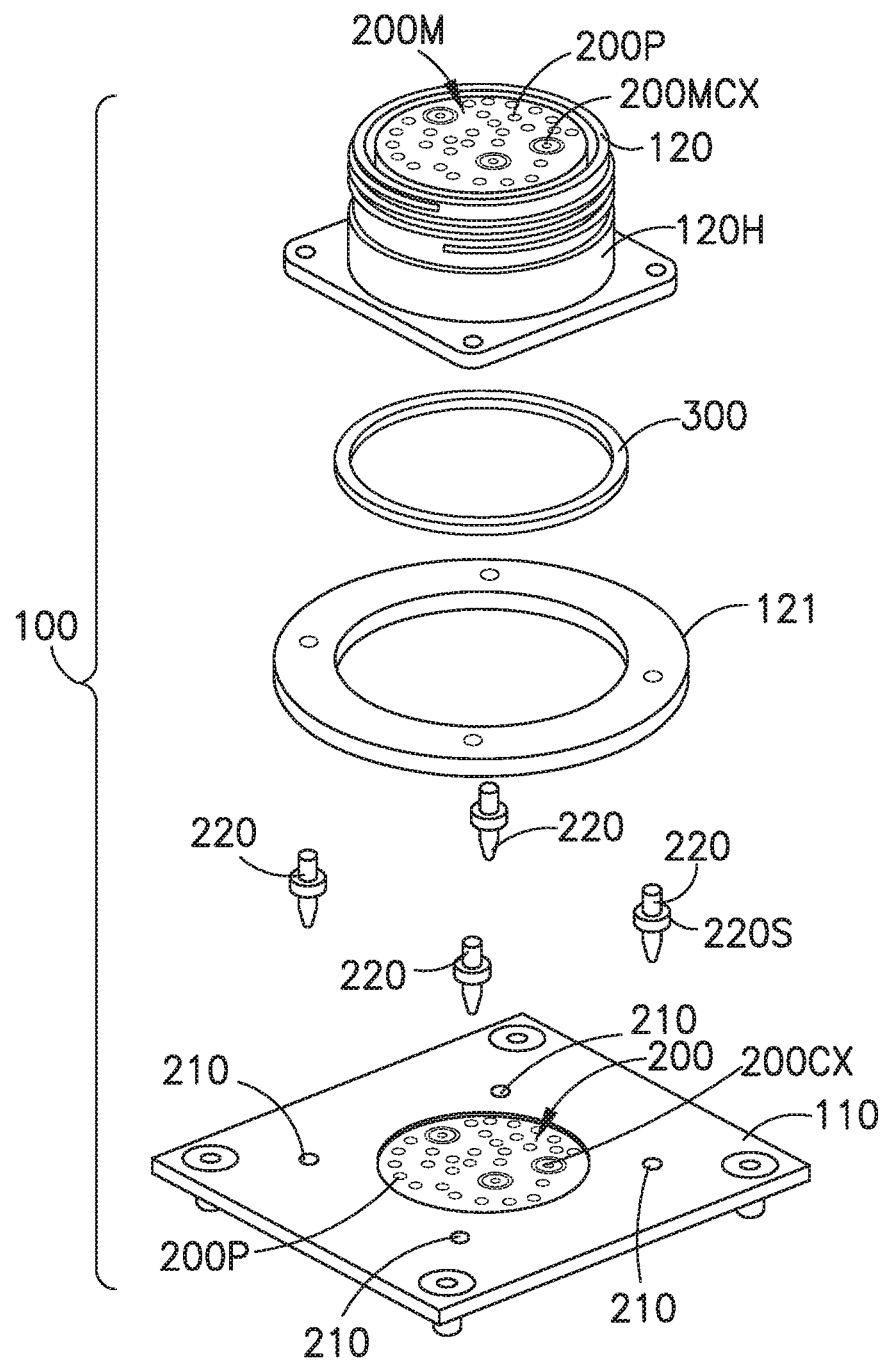
Figure 4:
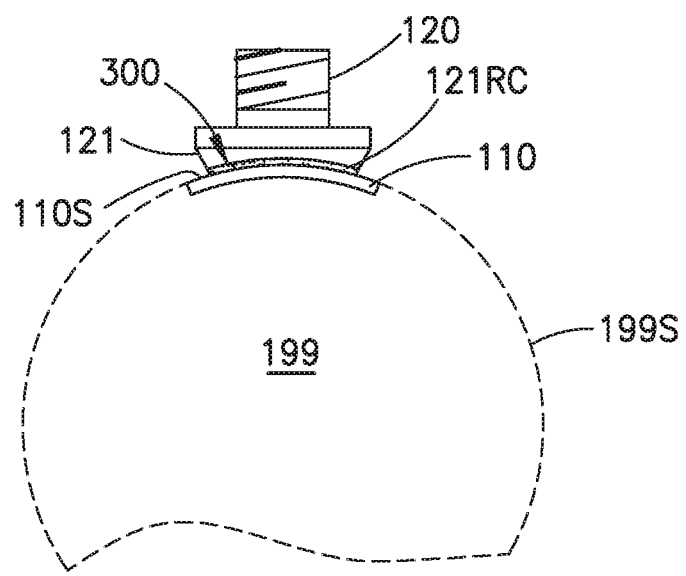
Figure 5:
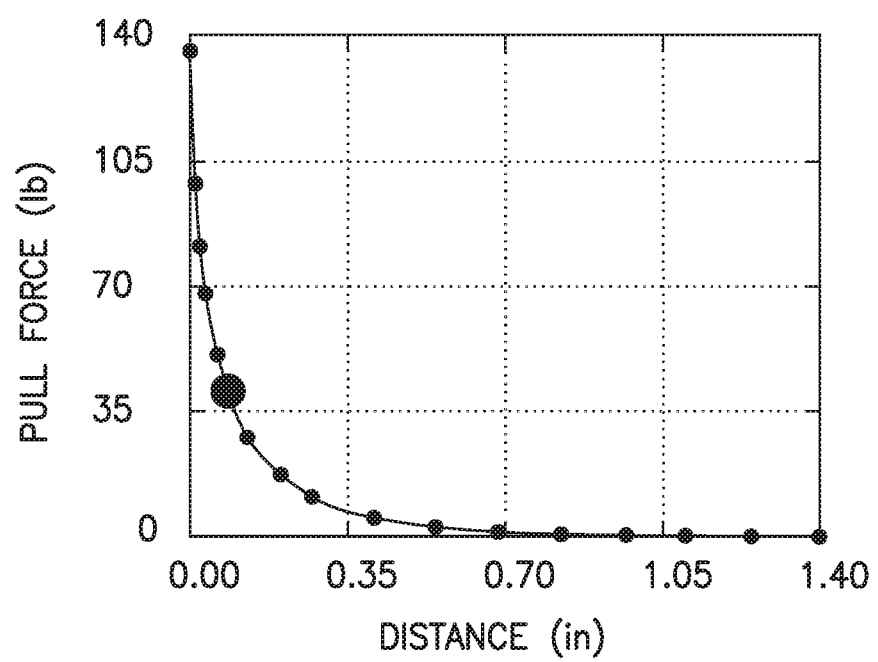
Figure 6:
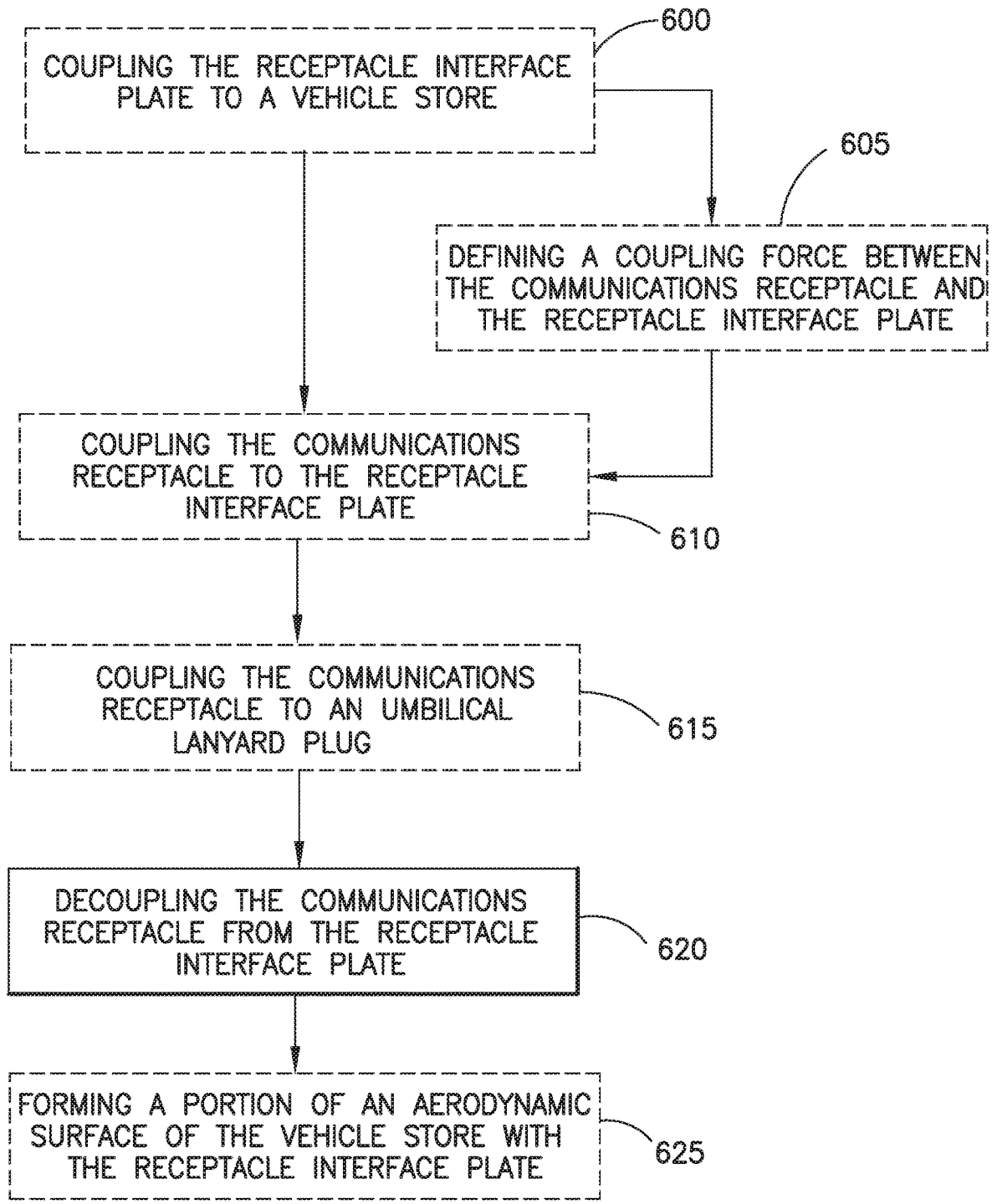
Figure 7:
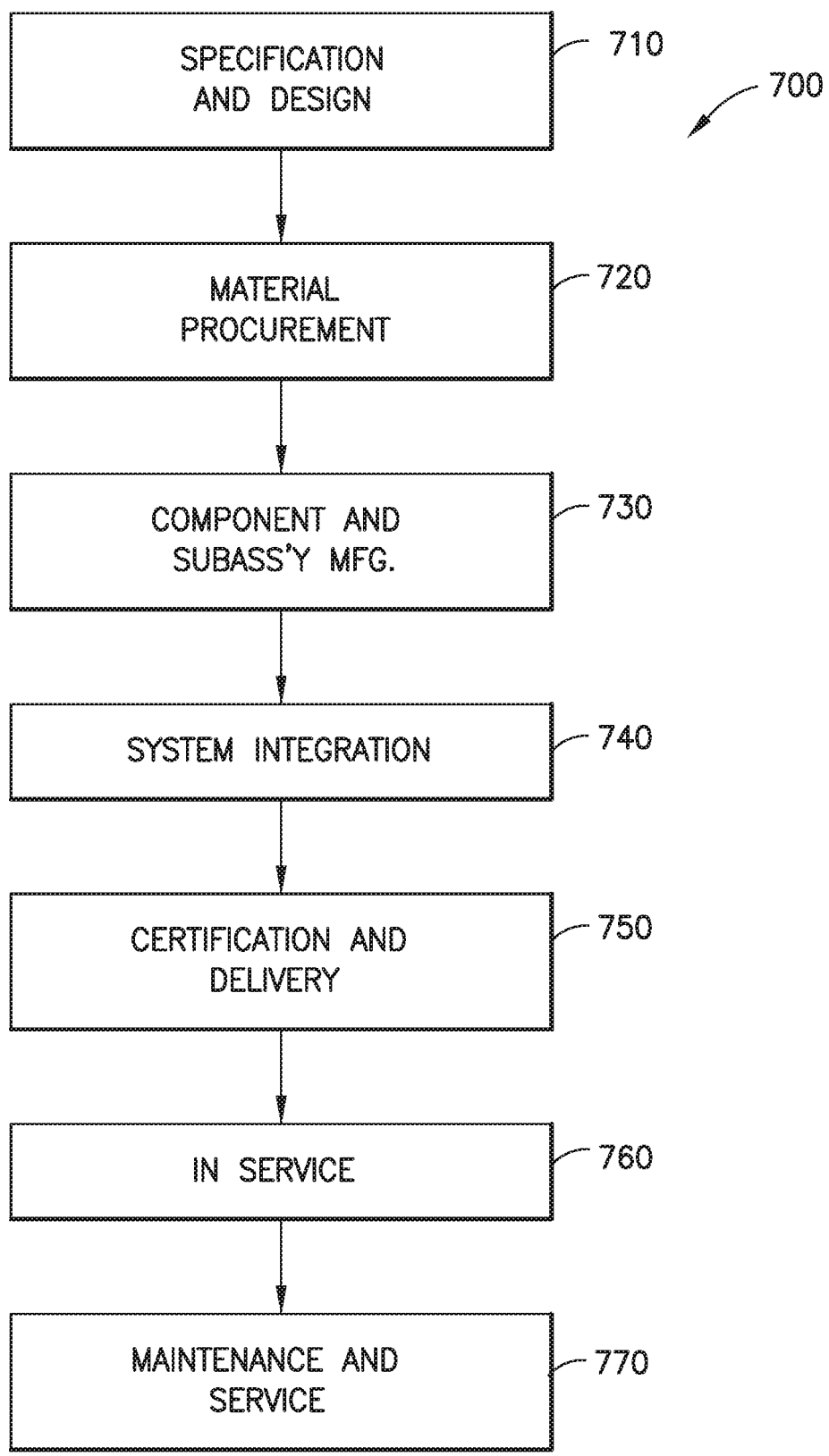

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a perspective illustration of a communications connector coupled to a vehicle store in accordance with aspects of the present disclosure;

FIG. 1B is a perspective illustration of the vehicle store, including the communications connector of FIG. 1A, coupled to a host vehicle in accordance with aspects of the present disclosure;

FIG. 1C is a perspective illustration of the vehicle store, including the communications connector of FIG. 1A, decoupled (or released) from the host vehicle in accordance with aspects of the present disclosure;

FIG. 2A is a perspective illustration of the communications connector of FIG. 1A in a coupled configuration in accordance with aspects of the present disclosure;

FIG. 2B is a perspective illustration of the communications connector of FIG. 1A in a decoupled configuration in accordance with aspects of the present disclosure;

FIG. 3A is a cross-sectional illustration of the communications connector of FIG. 1A in accordance with aspects of the present disclosure;

FIG. 3B is an exploded bottom perspective illustration of the communications connector of FIG. 1A in accordance with aspects of the present disclosure;

FIG. 3C is an exploded top perspective illustration of the communications connector of FIG. 1A in accordance with aspects of the present disclosure;

FIG. 4 is a plan view of the communications connector of FIG. 1A in accordance with aspects of the present disclosure;

FIG. 5 is an exemplary force diagram for the communications connector of FIG. 1A in accordance with aspects of the present disclosure;

FIG. 6 is an exemplary flow diagram of a method for the communications connector of FIG. 1A in accordance with aspects of the present disclosure; and FIG. 7 is an exemplary flow diagram of a vehicle production and service methodology.

DETAILED DESCRIPTION

Referring to FIGS. 1A, 1B, and 1C the aspects of the present disclosure provide for a communications connector 100 for a vehicle store 199. The communications connector 100 may be employed on any suitable vehicle store 199 (i.e., launch weapon such as a missile, bomb, or other store) that may be decoupled (e.g., released) from a host vehicle 197 that carries the vehicle store 199. The host vehicle 197 may be any suitable vehicle such as a fixed wing aircraft, a rotary wing aircraft, an automobile, a marine vessel, etc. that is configured to carry the vehicle store 199 and from which the vehicle store 199 is decoupled from upon deployment (e.g., such as for flight) of the vehicle store 199.

The communications connector 100 conforms to MIL-STD-1760 or AS5725 so that the communications connector 100 may be coupled to conventional MIL-STD-1760 or AS5725 umbilical lanyard plugs 198 of the host vehicle 197. The communications connector 100 is configured to at least partially decouple from the vehicle store 199 to decrease the aerodynamic drag of the vehicle store 199 (e.g., compared to conventional permanently coupled communications connectors) so that the vehicle store 199 may have a laminar airflow over the aerodynamic skin 199S of the vehicle store 199. The laminar flow and decreased drag of the aerodynamic skin 199S may increase the range performance of the vehicle store 199 compared to the range performance of a vehicle store having the permanently coupled communications connector protruding from the vehicle store aerodynamic skin.

The partial decoupling of the communications connector 100 from the vehicle store 199 is facilitated by a magnetic coupling between components of the communications connector 100. The magnetic coupling may have a coupling force F (FIG. 3A) that is less than the force needed to actuate the release of the conventional umbilical lanyard plug 198 from the communications connector 100. For example, conventionally the umbilical lanyard plug 198 is tethered to a bail bar 195 of the host vehicle 197 by a lanyard 198L, where the bail bar 195 is coupled to a host vehicle frame 197F. When the vehicle store is decoupled from the host vehicle 197 the decoupling of the vehicle store 199 pulls on the umbilical lanyard plug 198 (which is threaded onto the conventional communications connector). The pulling of the umbilical lanyard plug 198 causes the lanyard 198L to be tensioned between the vehicle store 199 and the bail bar 195 where the tensioned lanyard 198L actuates a decoupling mechanism of the umbilical lanyard plug 198 for decoupling the threaded coupling between the umbilical lanyard plug 198 and the conventional communications receptacle. In accordance with MIL-STD-38999/31 and MIL-STD-238999/36 the force to separate the umbilical lanyard plug 198 and the conventional communications receptacle is to not exceed about 400 N (about 90 lbs) for straight pulls and about 445 N (about 100 lbs) for about 15° pulls. In accordance with aspects of the present disclosure, the coupling force F of the magnetic coupling of the communications connector 100 is less than about 400 N (about 90 lbs) for straight pulls and about 445 N (about 100 lbs) for about 15° pulls, as will be described below, to substantially prevent actuation of the decoupling mechanism of the umbilical lanyard plug 198. In accordance with aspects of the present disclosure, the communications connector 100 may provide for a reliable in-flight decoupling interface between the host vehicle 197 and the vehicle store 199.

Referring to FIGS. 1A-1C, 2A, and 2B, the communications connector 100 includes a receptacle interface plate 110 and a communications receptacle 120. The receptacle interface plate 110 is configured to couple with a vehicle store frame 199F of the vehicle store 199 in any suitable manner, such as through any suitable chemical and/or mechanical fasteners 250. The receptacle interface plate 110 may be constructed of any suitable ferrous material that, in combination with the communications receptacle 120, provides for the magnetic coupling between the receptacle interface plate 110 and the communications receptacle 120. The receptacle interface plate 110 may have any suitable shape for coupling with the aerodynamic skin 199S of the vehicle store 199 so as to create an aerodynamically smooth vehicle store mold line at the interface between the receptacle interface plate 110 and the aerodynamic skin 199S when the communications receptacle 120 is decoupled from the receptacle interface plate 110. For example, as illustrated in FIGS. 1A-1C the receptacle interface plate 110 may be substantially a flat plate that is coupled to the vehicle store at a recessed portion of the aerodynamic skin 199S. Any steps formed between a fluid flow surface 110S of the receptacle interface plate 110 and the aerodynamic skin 199S may be negligible with respect to maintaining a laminar flow of fluid over the aerodynamic skin 199S. In other aspects, as illustrated in FIG. 4, the receptacle interface plate 110 may be contoured to substantially match a surface contour of the aerodynamic skin 199S so that the fluid flow surface 110S and the aerodynamic skin 199S are substantially flush with each other so as to form a substantially continuous (e.g., no substantial steps that would induce turbulent fluid flow and increase drag) or unbroken surface. For example, the receptacle interface plate 110 is contoured to form a portion of the aerodynamic skin 199S of the vehicle store 199.

Still referring to FIGS. 1A-1C, 2A, and 2B, the communications connector is configured for coupling with the umbilical lanyard plug 198 of the host vehicle 197. The communications receptacle 120 has at least one magnetic member 121 configured to couple the communications receptacle 120 to the receptacle interface plate 110 so that the communications receptacle 120 is decoupled from the receptacle interface plate 110 upon release of the vehicle store 199 from the host vehicle 197. The at least one magnetic member 121 is configured to independently generate an electromagnetic retention force (e.g., the coupling force F) between the receptacle interface plate 110 and the at least one magnetic member 121. For example, in one aspect, the at least one magnetic member 121 comprises a neodymium (or other rare Earth) permanent magnet however, in other aspects the at least one magnetic member may comprise any suitable material configured to generate the coupling force F described herein for coupling the communications receptacle 120 and the receptacle interface plate 110 without electrical input (e.g., without the input of electricity for generating the coupling force F).

Referring to FIGS. 2A, 2B, 3A, 3B, and 3C, the receptacle interface plate 110 includes at least one surface communication contactor 200. The at least one surface communication contactor 200 may be coupled to suitable wires of the vehicle store 199 in any suitable manner. The communications receptacle 120 includes a housing 120H having at least one mating surface communication contactor 200M disposed at least partially within the housing 120H. In accordance with aspect of the present disclosure the surface contactors are electrical/communication contacts that interface with each other through contact of abutting ends E1, E2 of the surface contactors (see e.g., pin contactors 200MP, 200P in FIG. 3A). In other aspects the communication contactors of the receptacle interface plate 110 and the communications receptacle 120 may be any suitable electrical/communication contactors (such as male and female plugs, etc.). The one or more of the at least one surface communication contactor 200 may include pad contactors 200P and the at least one mating surface communication contactor 200M may include pin contactors 200MP. In one aspect, the at least one surface communication contactor 200 includes (in addition to or in lieu of the pad contactors 200P) a communication coaxial contactor 200CX, which may be in the form of concentric contact pads. In other aspects, the at least one surface communication contactor 200 may include pin contactors and the at least one mating surface communication contactor 200M may include pad contactors. In still other aspects, any suitable combination of pin contactors and pad contactors may be used. The at least one mating surface communication contactor 200M may also include (in addition to or in lieu of the pin contactors 200MP) another communication coaxial contactor 200MCX (which may be in the form of a pin and a concentric ring surrounding the pin) configured to communicably couple with the communication coaxial contactor 200CX of the at least one surface communication contactor 200. One or more of the at least one surface communication contactor 200 and the at least one mating surface communication contactor 200M may be a biased contactor 200B (such as a spring-loaded pogo-pin contactor) so that when the communications receptacle 120 is coupled to the receptacle interface plate 110 the at least one surface communication contactor 200 and the at least one mating surface communication contactor 200M are in biased communicative contact. For example, the one or more of the at least one surface communication contactor 200 and the at least one mating surface communication contactor 200M may have one or more biasing members 310, 310A, 310B (e.g., springs, etc. illustrated in FIG. 3A with respect to the at least one mating surface communication contactor 200M but it should be understood that the at least one surface communication contactor 200 may be similarly configured) that bias the one or more of the at least one surface communication contactor 200 and the at least one mating surface communication contactor 200M towards each other to facilitate communicative contact there between. As shown in FIG. 3A, the biased contactor 200B may include one or more pin contactor 200P, 200MP and/or one or more coaxial contactor 200CX, 200MCX.

In one aspect, the at least one magnetic member 121 is coupled to the housing 120H so as to circumferentially surround the at least one mating surface communication contactor 200M. In other aspects, the at least one magnetic member 121 may partially surround the at least one mating surface communication contactor 200M. The housing 120H is configured to shield the at least one surface communication contactor 200 and the at least one mating surface communication contactor 200M from electromagnetic effects of the at least one magnetic member 121. For example, the housing 120H comprises one or more of a metal, a plastic, and a composite material. In one aspect, where the housing 120H comprises a metal, the metal may provide for the shielding of the at least one surface communication contactor 200 and the at least one mating surface communication contactor 200M from electromagnetic effects of the at least one magnetic member 121. In other aspect, where the housing 120H comprises metal, plastic, and/or composite material, the housing 120H may have an electromagnetic protective coating 120HC to provide for the shielding of the at least one surface communication contactor 200 and the at least one mating surface communication contactor 200M from electromagnetic effects of the at least one magnetic member 121 (e.g., additional shielding may be provided to the metal housing 120H by the electromagnetic protective coating 120HC).

In accordance with the aspects of the present disclosure, and still referring to FIGS. 2A, 2B, 3A, 3B, and 3C, the housing 120H includes a seal member 300 that circumferentially surrounds the at least one mating surface communication contactor 200M. While a single seal member 300 is illustrated, in other aspects there may be multiple seal members. The seal member 300 may facilitate dust/moisture (or other suitable debris) protection for the at least one surface communication contactor 200 and the at least one mating surface communication contactor 200M. In one aspect, the seal member 300 is radially disposed between the at least one magnetic member 121 and the at least one mating surface communication contactor 200M however, in other aspects, the seal member 300 may be radially disposed outward of the at least one magnetic member 121. In one aspect, the seal member 300 may be encapsulated between the housing 120H and the receptacle interface plate 110 when the communications receptacle 120 is coupled to the receptacle interface plate 110 (e.g., the at least one magnetic member 121, the housing 120H and the receptacle interface plate 110 may encapsulate the seal 300). In one aspect, the seal member 300 may be any suitable O-ring or other gasket disposed between the housing 120H and the receptacle interface plate 110 to seal an interface INT between the receptacle interface plate 110 and the communications receptacle 120. In another aspect, the seal member 300 may include a resilient coating 121RC disposed on the at least one magnetic member 121, where the resilient coating 121RC seals the interface INT between the receptacle interface plate 110 and the communications receptacle 120. The resilient coating 121RC and/or the O-ring may serve as a conformal seal that provides sealing of substantially flat (un-contoured) surfaces to each other (such as the substantially flat surfaces of the receptacle interface plate 110 and communications receptacle 120 illustrated in e.g., FIG. 3A) and contoured surfaces to each other (such as the contoured surfaces of the receptacle interface plate 110 and communications receptacle 120 illustrated in FIG. 4).

In one aspect, at least one standoff 120S may be disposed between the housing 120H and the receptacle interface plate 110. The at least one standoff 120S may define an air gap G between the at least one magnetic member 121 and a coupling surface 110CS (such as the fluid flow surface 110S) of the receptacle interface plate 110, where a release force between the at least one magnetic member 121 and the coupling surface 110CS of the receptacle interface plate 110 depends on the air gap G. For example, FIG. 5 illustrates an exemplary graph of the release force (e.g., pull force) compared to the distance or gap G between the at least one magnetic member 121 and a coupling surface 110CS. As can be seen in FIG. 5, the smaller the gap G the greater the release force between the at least one magnetic member 121 and the coupling surface 110CS. In one aspect, the gap G may be set (e.g., with the standoff 120S) so that the release force is about 40 lbs (about 178 N) while in other aspects the gap G may be set so that the release force is greater than or less than about lbs (about 178 N) (noting that the release force set by the gap G is to be less than the actuation force of the conventional umbilical lanyard plug 198 release mechanism noted above). In one aspect, the housing 120H defines an air gap G (e.g., the housing comprises the at least one standoff 120S) between the at least one magnetic member 121 and a coupling surface of the receptacle interface plate 110. In another aspect, the communications connector 100 includes a coating 121C (such as a hard or non-pliable coating) disposed on the at least one magnetic member 121, where the coating 121C defines an air gap G between the at least one magnetic member 121 and a coupling surface of the receptacle interface plate 110. Where the coating 121C is employed there may be a gap G2 disposed between the housing 120H and the receptacle interface plate 110 so that the coating 121C defines the gap G independent of the housing 120H.

The receptacle interface plate 110 includes at least one recess or aperture 210. The housing 120H includes at least one protrusion 220 configured to couple with the at least one recess or aperture 210. The coupling of the at least one protrusion 220 with the at least one recess or aperture 210 aligns the at least one surface communication contactor 200 of the receptacle interface plate 110 with the at least one mating surface communication contactor 200M of the communications receptacle 120. The coupling of the at least one protrusion 220 with the at least one recess or aperture 210 may also prevent rotation of the communications receptacle 120 relative to the receptacle interface plate 110, such as when the umbilical lanyard plug 198 is threaded onto the housing 120H of the communications receptacle 120. For example, the at least one protrusion 220 may carry a sheer load when the umbilical lanyard plug 198 (which conforms to MIL-STD-1760 or AS5725) is threaded onto the communications receptacle (which also conforms to MIL-STD-1760 or AS5725). In one aspect, the at least one protrusion 220 comprises at least a pin that is configured to couple the at least one magnetic member 121 and the housing 120H together in any suitable manner (e.g., interference press fitting, threading, etc.). For example, a portion of the at least one protrusion 220 may at least partially pass through apertures 120HA, 121A of the housing 120H and at least one magnetic member 121 so that the portion of the at least one protrusion 220 couples with the aperture 120HA of the housing 120H. The at least one protrusion 220 may include a shoulder 220S (FIGS. 3A-3C) that is configured to extend radially beyond the perimeter of the aperture 121A of the at least one magnetic member 121 so as to retain the at least one magnetic member 121 substantially against the housing 120H. In other aspects, the at least one magnetic member 121 and the housing 120H may be coupled to each other in any suitable manner (such as with any suitable chemical and/or mechanical fasteners).

Referring to FIGS. 1A-1C and 6, an exemplary method for decoupling a communications connector 100 of a vehicle store 199 when the vehicle store 199 is released from a host vehicle 197. As described above, the communications connector 100 includes a receptacle interface plate 110 and a communications receptacle 120. The method includes coupling the receptacle interface plate 110 to the vehicle store 199 as described above (FIG. 6, Block 600). The coupling force between the receptacle interface plate 110 and the communications receptacle 120 may be defined (FIG. 6, Block 605) as described above (e.g., by the air gap G, see FIG. 3A) so that the coupling force F generated between the at least one magnetic member 121, of the communications receptacle 120, and the receptacle interface plate 110 is less than a coupling force between the umbilical lanyard plug 198 and the communications receptacle 120 so that the umbilical lanyard plug 198 decouples the communications receptacle 120 from the receptacle interface plate 110 (e.g., the threaded engagement between the communications receptacle 120 and the umbilical lanyard plug 198 overcomes the coupling force F (FIG. 3A) and the umbilical lanyard plug 198 pulls the communications receptacle 120 from the receptacle interface plate 110) when the vehicle store 199 is released from the host vehicle 197.

The communications receptacle 120 may be coupled to the receptacle interface plate 110 (which is coupled to the vehicle store frame 199F) (FIG. 6, Block 610) so that the at least one protrusion 220 couples with the recess or aperture 210 and the at least one surface communication contactor 200 and the at least one mating surface communication contactor 200M are aligned. In one aspect, the at least one protrusion 220 and the recess or aperture 210 may have a spatial configuration that ensures alignment of the at least one surface communication contactor 200 and the at least one mating surface communication contactor 200M (e.g., the spatial configuration of the at least one protrusion 220 and the recess or aperture 210 is such that the communications receptacle 120 can only be coupled with the receptacle interface plate 110 in a single aligned orientation). In other aspects alignment pins or features may be provided on one or more of the communications receptacle 120 and the receptacle interface plate 110 for alignment of the at least one surface communication contactor 200 and the at least one mating surface communication contactor 200M. Coupling of the communications receptacle 120 to the receptacle interface plate 110 may be performed any time prior to or at the time of installation of the vehicle store 199 to the host vehicle 197 so that the vehicle store 199 is ready for deployment. Also, during installation of the vehicle store 199 to the host vehicle 197, the communications receptacle 120 may be coupled to the umbilical lanyard plug 198 (FIG. 6, Block 615).

The communications receptacle 120, that is coupled to an umbilical lanyard plug 198 of the host vehicle 197, may be decoupled from the receptacle interface plate 110, that is coupled to the vehicle store 199 (FIG. 6, Block 620) such as when the vehicle store 199 is released or decoupled from the host vehicle 197 for independent flight of the vehicle store 199. The decoupling of the communications receptacle 120 from the receptacle interface plate 110 forms a portion of an aerodynamic skin 199S of the vehicle store 199 with the receptacle interface plate 110 (FIG. 6, Block 625), which may decrease aerodynamic drag of the vehicle store 199 and increase the range performance of the vehicle store 199.

Referring to FIGS. 1 and 7, examples of the present disclosure may be described in the context of aircraft manufacturing and service method 700 as shown in FIG. 7. In other aspects, the examples of the present disclosure may be applied in any suitable industry, such as e.g., automotive, maritime, aerospace, etc. as noted above, such as where a detachable communications connector is used. With respect to vehicle manufacturing (e.g., such as the manufacture of vehicle store 199), during pre-production, illustrative method 700 may include specification and design (block 710) of vehicle store 199 and material procurement (block 720). During production, component and subassembly manufacturing (block 730) and system integration (block 740) of vehicle store 199 may take place. Thereafter, vehicle store 199 may go through certification and delivery (block 750) to be placed in service (block 760). While in service, vehicle store 199 may be scheduled for routine maintenance and service (block 770). Routine maintenance and service may include modification, reconfiguration, refurbishment, etc. of one or more systems of vehicle store 199 which may include and/or be facilitated by communications connector 100 described herein.

Each of the processes of illustrative method 700 may be performed or carried out by a system integrator, a third party, and/or an operator (e.g., a customer). For the purposes of this description, a system integrator may include, without limitation, any number of vehicle store manufacturers and subcontractors; a third party may include, without limitation, any number of vendors, subcontractors, and suppliers; and an operator may be military entity, defense contractor, and so on.

The apparatus(es), system(s), and method(s) shown or described herein may be employed during any one or more of the stages of the manufacturing and service method 700. For example, components or subassemblies corresponding to component and subassembly manufacturing (block 730) may be fabricated or manufactured in a manner similar to components or subassemblies produced while vehicle store 199 is in service (block 760). Similarly, one or more examples of the apparatus or method realizations, or a combination thereof, may be utilized, for example and without limitation, while vehicle store 199 is in service (block 760) and/or during maintenance and service (block 770).

The following are provided in accordance with the aspects of the present disclosure:

A1. A communications connector for a vehicle store, the communications connector comprising:
a receptacle interface plate; and
a communications receptacle configured for coupling with an umbilical lanyard plug of a host vehicle the communications receptacle having at least one magnetic member configured to couple the communications receptacle to the receptacle interface plate so that the communications receptacle is decoupled from the receptacle interface plate upon release of the vehicle store from the host vehicle.

A2. The communications connector of paragraph A1, wherein:
the receptacle interface plate includes at least one surface communication contactor;
the communications receptacle including a housing having at least one mating surface communication contactor disposed at least partially within the housing, the at least one magnetic member being coupled to the housing so as to circumferentially surround the at least one mating surface communication contactor.

A3. The communication connector of paragraph A2, wherein one or more of the at least one surface communication contactor and the at least one mating surface communication contactor is a biased contactor so that when the communications receptacle is coupled to the receptacle interface plate the at least one surface communication contactor and the at least one mating surface communication contactor are in biased communicative contact.

A4. The communication connector of paragraph A2, wherein the at least one surface communication contactor includes a communication coaxial contactor.

A5. The communication connector of paragraph A4, wherein the at least one at least one mating surface communication contactor includes another communication coaxial contactor configured to communicably couple with the communication coaxial contactor of the at least one surface communication contactor.

A6. The communications connector of paragraph A2, wherein the housing further includes a seal member that circumferentially surrounds the at least one mating surface communication contactor.

A7. The communications connector of paragraph A6, wherein the seal member is radially disposed between the at least one magnetic member and the at least one mating surface communication contactor.

A8. The communications connector of paragraph A2, wherein the housing is configured to shield the at least one surface communication contactor and the at least one mating surface communication contactor from electromagnetic effects of the at least one magnetic member.

A9. The communications connector of paragraph A8, wherein the housing comprises one or more of a metal, a plastic, and a composite material.

A10. The communications connector of paragraph A8, wherein the housing comprises an electromagnetic protective coating.

A11. The communications connector of paragraph A2, further comprising:
a resilient coating disposed on the at least one magnetic member, where the resilient coating seals an interface between the receptacle interface plate and the communications receptacle; and
at least one standoff disposed between the housing and the receptacle interface plate, the at least one standoff defines an air gap between the at least one magnetic member and a coupling surface of the receptacle interface plate, where a release force between the at least one magnetic member and the coupling surface of the receptacle interface plate depends on the air gap.

A12. The communications connector of paragraph A11, wherein the housing comprises the at least one standoff.

A13. The communications connector of paragraph A1, wherein:
the receptacle interface plate includes at least one recess or aperture, and
the housing includes at least one protrusion configured to couple with the at least one recess or aperture where coupling of the at least one protrusion with the at least one recess or aperture aligns the at least one surface communication contactor with the at least one mating surface communication contactor and prevents rotation of the communications receptacle relative to the receptacle interface plate.

A14. The communications connector of paragraph A1, wherein the housing defines an air gap between the at least one magnetic member and a coupling surface of the receptacle interface plate, where a release force between the at least one magnetic member and the coupling surface of the receptacle interface plate depends on the air gap.

A15. The communications connector of paragraph A1, further comprising a coating disposed on the at least one magnetic member, where the coating defines an air gap between the at least one magnetic member and a coupling surface of the receptacle interface plate, where a release force between the at least one magnetic member and the coupling surface of the receptacle interface plate depends on the air gap.

A16. The communications connector of paragraph A1, wherein the at least one magnetic member is configured to independently generate an electromagnetic retention force between the receptacle interface plate and the at least one magnetic member.

A17. The communications connector of paragraph A1, wherein the at least one magnetic member comprises neodymium.

A18. The communications connector of paragraph A1, wherein the communications receptacle conforms to MIL-STD-1760 or AS5725.

A19. The communications connector of paragraph A1, wherein the receptacle interface plate is contoured to form a portion of an aerodynamic skin of the vehicle store.

B1. A vehicle store comprising:
a communications connector including
a receptacle interface plate, and
a communications receptacle configured for coupling with an umbilical lanyard plug of a host vehicle, the communications receptacle having at least one magnetic member configured to couple the communications receptacle to the receptacle interface plate so that the communications receptacle is decoupled from the receptacle interface plate upon release of the vehicle store from the host vehicle.

B2. The vehicle store of paragraph B 1, wherein:
the receptacle interface plate includes at least one surface communication contactor;
the communications receptacle including a housing having at least one mating surface communication contactor disposed at least partially within the housing, the at least one magnetic member being coupled to the housing so as to circumferentially surround the at least one mating surface communication contactor.

B3. The vehicle store of paragraph B2, wherein one or more of the at least one surface communication contactor and the at least one mating surface communication contactor is a biased contactor so that when the communications receptacle is coupled to the receptacle interface plate the at least one surface communication contactor and the at least one mating surface communication contactor are in biased communicative contact.

B4. The vehicle store of paragraph B2, wherein the at least one surface communication contactor includes a communication coaxial contactor.

B5. The vehicle store of paragraph B4, wherein the at least one at least one mating surface communication contactor includes another communication coaxial contactor configured to communicably couple with the communication coaxial contactor of the at least one surface communication contactor.

B6. The vehicle store of paragraph B2, wherein the housing further includes a seal member that circumferentially surrounds the at least one mating surface communication contactor.

B7. The vehicle store of paragraph B6, wherein the seal member is radially disposed between the at least one magnetic member and the at least one mating surface communication contactor.

B8. The vehicle store of paragraph B2, wherein the housing is configured to shield the at least one surface communication contactor and the at least one mating surface communication contactor from electromagnetic effects of the at least one magnetic member.

B9. The vehicle store of paragraph B8, wherein the housing comprises one or more of a metal, a plastic, and a composite material.

B10. The vehicle store of paragraph B8, wherein the housing comprises an electromagnetic protective coating.

B11. The vehicle store of paragraph B2, further comprising:
a resilient coating disposed on the at least one magnetic member, where the resilient coating seals an interface between the receptacle interface plate and the communications receptacle; and
at least one standoff disposed between the housing and the receptacle interface plate, the at least one standoff defines an air gap between the at least one magnetic member and a coupling surface of the receptacle interface plate, where a release force between the at least one magnetic member and the coupling surface of the receptacle interface plate depends on the air gap.

B12. The vehicle store of paragraph B11, wherein the housing comprises the at least one standoff.

B13. The vehicle store of paragraph B2, wherein:
the receptacle interface plate includes at least one recess or aperture, and
the housing includes at least one protrusion configured to couple with the at least one recess or aperture where coupling of the at least one protrusion with the at least one recess or aperture aligns the at least one surface communication contactor with the at least one mating surface communication contactor and prevents rotation of the communications receptacle relative to the receptacle interface plate.

B14. The vehicle store of paragraph B2, wherein the housing defines an air gap between the at least one magnetic member and a coupling surface of the receptacle interface plate, where a release force between the at least one magnetic member and the coupling surface of the receptacle interface plate depends on the air gap.

B15. The vehicle store of paragraph B1, further comprising a coating disposed on the at least one magnetic member, where the coating defines an air gap between the at least one magnetic member and a coupling surface of the receptacle interface plate, where a release force between the at least one magnetic member and the coupling surface of the receptacle interface plate depends on the air gap.

B16. The vehicle store of paragraph B 1, wherein the at least one magnetic member is configured to independently generate an electromagnetic retention force between the receptacle interface plate and the at least one magnetic member.

B17. The vehicle store of paragraph B1, wherein the at least one magnetic member comprises neodymium.

B18. The vehicle store of paragraph B1, wherein the communications receptacle conforms to MIL-STD-1760 or AS5725.

B19. The vehicle store of paragraph B1, wherein the receptacle interface plate is contoured to form a portion of an aerodynamic skin of the vehicle store.

C1. A method for decoupling a communications connector of a vehicle store when the vehicle store is released from a host vehicle where the communications connector includes a receptacle interface plate and a communications receptacle, the method comprising:
decoupling the communications receptacle, that is coupled to an umbilical lanyard plug of a host vehicle, from the receptacle interface plate, that is coupled to the vehicle store;
wherein a coupling force generated between at least one magnetic member, of the communications receptacle, and the receptacle interface plate is less than a coupling force between the umbilical lanyard plug and the communications receptacle so that the umbilical lanyard plug decouples the communications receptacle from the receptacle interface plate when the vehicle store is released from the host vehicle.

C2. The method of paragraph C1, further comprising forming a portion of an aerodynamic skin of the vehicle store with the receptacle interface plate when the communications receptacle is decoupled from the receptacle interface plate.

C3. The method of paragraph C1, further comprising defining the coupling force generated between at least one magnetic member of the communications receptacle and the receptacle interface plate with an air gap disposed between the at least one magnetic member and the receptacle interface plate.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 6 and 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 6 and 7, and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A communications connector for a vehicle store, the communications connector comprising:
    a vehicle store receptacle interface plate; and
    a vehicle store communications receptacle, configured for coupling to a host vehicle, that is magnetically coupled to the vehicle store receptacle interface plate so that the vehicle store communication receptacle is decoupled from the vehicle store receptacle interface plate upon release of the vehicle store from the host vehicle.

2. The communications connector of claim 1, wherein:
the vehicle store receptacle interface plate includes at least one surface communication contactor;
the vehicle store communications receptacle including a housing having at least one mating surface communication contactor disposed at least partially within the housing, at least one magnetic member of the vehicle store communications receptacle being coupled to the housing so as to circumferentially surround the at least one mating surface communication contactor.

3. The communication connector of claim 2, wherein one or more of the at least one surface communication contactor and the at least one mating surface communication contactor is a biased contactor so that when the vehicle store communications receptacle is coupled to the vehicle store receptacle interface plate the at least one surface communication contactor and the at least one mating surface communication contactor are in biased communicative contact.

4. The communications connector of claim 2, wherein the housing further includes a seal member that circumferentially surrounds the at least one mating surface communication contactor.

5. The communications connector of claim 2, wherein the housing is configured to shield the at least one surface communication contactor and the at least one mating surface communication contactor from electromagnetic effects of the at least one magnetic member.

6. The communications connector of claim 2, further comprising:
a resilient coating disposed on the at least one magnetic member, where the resilient coating seals an interface between the vehicle store receptacle interface plate and the vehicle store communications receptacle; and
at least one standoff disposed between the housing and the vehicle store receptacle interface plate, the at least one standoff defines an air gap between the at least one magnetic member and a coupling surface of the receptacle interface plate, where a release force between the at least one magnetic member and the coupling surface of the vehicle store receptacle interface plate depends on the air gap.

7. The communications connector of claim 2, wherein:
the vehicle store receptacle interface plate includes at least one recess or aperture, and
the housing includes at least one protrusion configured to couple with the at least one recess or aperture where coupling of the at least one protrusion with the at least one recess or aperture aligns the at least one surface communication contactor with the at least one mating surface communication contactor and prevents rotation of the vehicle store communications receptacle relative to the receptacle interface plate.

8. The communications connector of claim 2, wherein the housing defines an air gap between the at least one magnetic member and a coupling surface of the vehicle store receptacle interface plate, where a release force between the at least one magnetic member and the coupling surface of the vehicle store receptacle interface plate depends on the air gap.

9. The communications connector of claim 1, wherein:
the vehicle store communications receptacle comprises at least one magnetic member; and
a coating is disposed on the at least one magnetic member, where the coating defines an air gap between the at least one magnetic member and a coupling surface of the vehicle store receptacle interface plate, where a release force between the at least one magnetic member and the coupling surface of the vehicle store receptacle interface plate depends on the air gap.

10. The communications connector of claim 1, wherein the vehicle store receptacle interface plate is contoured to form a portion of an aerodynamic skin of the vehicle store.

11. A vehicle store comprising:
a communications connector including
a receptacle interface plate, and
a communications receptacle configured for coupling with a host vehicle, the communications receptacle being magnetically coupled to the receptacle interface plate so that the vehicle store communication receptacle is decoupled from the receptacle interface plate upon release of the vehicle store from the host vehicle.

12. The vehicle store of claim 11, wherein:
the receptacle interface plate includes at least one surface communication contactor;
the communications receptacle including a housing having at least one mating surface communication contactor disposed at least partially within the housing, at least one magnetic member of the vehicle store communications receptacle being coupled to the housing so as to circumferentially surround the at least one mating surface communication contactor.

13. The vehicle store of claim 12, wherein the at least one surface communication contactor includes a communication coaxial contactor.

14. The vehicle store of claim 13, wherein the at least one mating surface communication contactor includes another communication coaxial contactor configured to communicably couple with the communication coaxial contactor of the at least one surface communication contactor.

15. The vehicle store of claim 12, wherein the housing further includes a seal member that circumferentially surrounds the at least one mating surface communication contactor.

16. The vehicle store of claim 12, wherein the housing defines an air gap between the at least one magnetic member and a coupling surface of the receptacle interface plate, where a release force between the at least one magnetic member and the coupling surface of the receptacle interface plate depends on the air gap.

17. The vehicle store of claim 11, wherein the vehicle store communications receptacle comprises at least one magnetic member configured to independently generate an electromagnetic retention force between the receptacle interface plate and the at least one magnetic member.

18. A method for decoupling a communications connector of a vehicle store when the vehicle store is released from a host vehicle where the communications connector includes a receptacle interface plate and a communications receptacle, the method comprising:
decoupling a magnetic coupling between the communications receptacle, that is coupled to a host vehicle, and the receptacle interface plate, that is coupled to the vehicle store;
wherein a magnetic coupling force generated between the communications receptacle and the receptacle interface plate is less than a coupling force between the host vehicle and the communications receptacle so that the communications receptacle is decoupled from the receptacle interface plate when the vehicle store is released from the host vehicle.

19. The method of claim 18, further comprising forming a portion of an aerodynamic skin of the vehicle store with the receptacle interface plate when the communications receptacle is decoupled from the receptacle interface plate.

20. The method of claim 18, further comprising defining the coupling force generated between at least one magnetic member of the communications receptacle and the receptacle interface plate with an air gap disposed between the at least one magnetic member and the receptacle interface plate.

\* \* \* \* \*